3,163,512
METHOD OF MAKING CELLULAR GLASS BODIES
František Schill, 976 Labska Kotlina, Hradec Kralove, Czechoslovakia, and František Konarek, 6 Machova, Prague XII, Czechoslovakia
Filed Mar. 10, 1960, Ser. No. 14,137
Claims priority, application Czechoslovakia, May 28, 1957, 1,978/57
1 Claim. (Cl. 65—22)

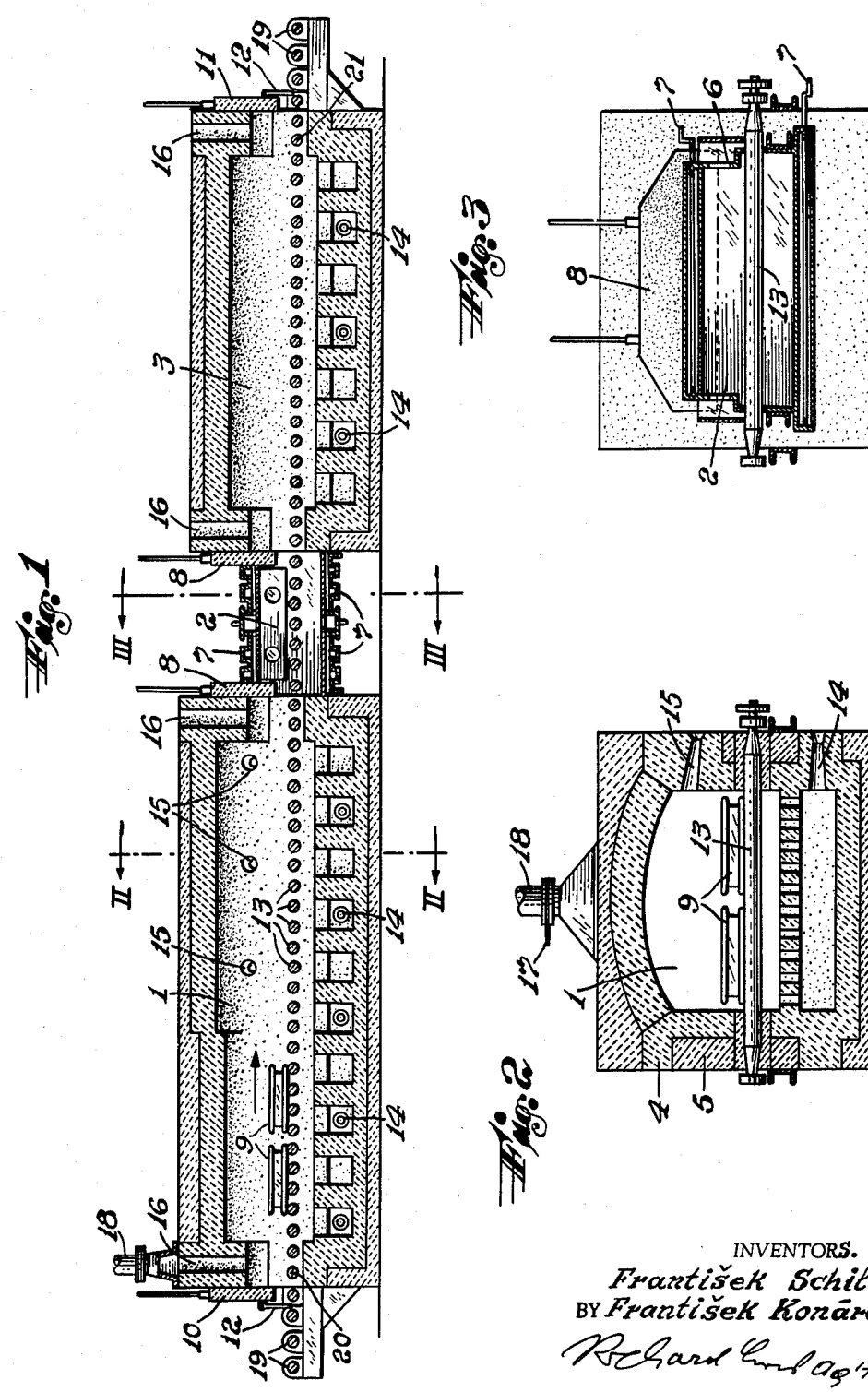

This invention relates to the manufacture of cellular glass bodies, and more particularly to a sequence of thermal treatments in the manufacture of such bodies.

Structural elements of cellular glass have found wide acceptance in the building industry because of their excellent thermal inslating properties, their mechanical strength, their resistance to heat, and their immunity to attack by chemical or biological agents. Cellular glass is employed in a variety of shapes, mainly in blocks and panels. Soda-lime glasses are the most common materials in cellular glass because of their low cost and convenient processing properties, but practically all glasses are capable of being cellulated under suitable conditions. The product consists of a continuous skeleton of glass enclosing inumerable small closed cells.

The process of manufacture generally involves the reaction of chemical agents which are substantially inert at temperatures below the sintering temperature of the glass used, and react with each other to form a gaseous reaction product at a temperature above the sintering temperature of the glass, that is, at a temperature at which the glass is plastically deformable into gastight bubbles. For reasons of economy, carbon and an oxidizing agent, such as a sulfate are the preferred reagents, and may be admixed to powdered glass to form a bloatable mixture.

While the process of cellulation is well known and simple in principle, it offers serious problems under conditions of actual production. A suitable quantity of a mixture of glass and reagents, preferably in powdered form, is placed into a heat resistant metal mold which is first heated to the sintering temperature of the glass, thereupon to the bloating temperature at which the gas-forming reaction sets in. The bloating temperature is maintained until the expanding mass fills the mold and assumes the desired shape. Careful control of the composition of the original charge and precise timing are necessary to obtain the desired uniformity of cellulation and optimum cell size.

Particular difficulties are encountered in cooling the bloated material. The glass is relatively fluid at the bloating temperature, and offers only moderate resistance to stresses. The gaseous reaction products in the cells, which balance the atmospheric pressure of the ambient air, contract as the temperature is reduced whereupon the cellular glass body shrinks. Because of differences in specific surface area, edge portions are cooled more rapidly and tend to shrink less than portions remote from the edges which may lead to a non-uniform shrinkage pattern usually referred to as "dishing."

The very low heat conductivity of cellular glass makes for slow progress of solidification from the shell to the core of a cellular glass body upon cooling from the bloating temperature. This fact already has been used to advantage. It has been proposed to cool a cellular glass body from the bloating temperature to a stabilizing temperature below the sintering temperature, but above the annealing temperature of the glass. This causes the shell partly to solidify to a semi-rigid consistency so as to limit shrinkage without setting up excessive internal stresses by contraction of the gaseous material trapped in the cells. After termination of cellulation, the glass body is removed from the mold, chilled to a temperature below the annealing temperature, annealed and cooled. Because of the very delicate balance which is to be maintained between the internal gas pressure and the mechanical strength of the semi-rigid shell during the stabilization period, this method has been difficult to control. Surface cracks are so frequently formed that it is common practice to trim cellular glass blocks to remove about 10 to 15 percent of the total material from the surfaces. It is correspondingly necessary to employ oversize molds which result in raw cellular glass bodies having a volume appreciably greater than the desired final shape.

It has now been found that the advantages of the conventional heat treating process can be retained, and surface cracks can be avoided by a novel thermal treatment of the cellular glass body after bloating. The method of the invention also results in greater homogeneity of the product, and is more readily controlled. The glass body is fully stabilized and becomes incapable of further shrinkage while it is still in the mold. Cracking of the surface during removal from the mold and during subsequent cooling is thus safely avoided. No dimensional changes can occur during annealing and cooling in the lehr. The method of the invention also permits removal of a cellular glass body from its mold at a temperature above the annealing temperature of the glass which is not only beneficial to the surface qualities of the finished product, but also permits most economical use of equipment. The method of the invention provides better control of the cellulation process than was heretofore possible, and completely terminates cellulation prior to cooling.

It has been found that these and other advantages can be obtained by rapidly cooling the mold containing the bloated material from the bloating temperature directly to a temperature below the annealing temperature of the glass, and then reheating to a temperature above the annealing temperature, below the sintering temperature to stabilize the glass.

As is well known, glass does not have a sharply defined melting point, but the transition from the solid to the liquid state is best described as a gradual change in viscosity. The viscosity of a glass does not only depend on its temperature, but also on the manner in which the temperature is reached, and the time element is important. When a body of glass is heated to a stabilizing temperature from a lower temperature, its viscosity will be appreciably higher for a significant period of time than it would have been if the glass body had been cooled to the same stabilizing temperature from a higher temperature. A body of cellular glass produced by the method of the invention has therefore a shell the viscosity of which is substantially higher than that of a cellular glass body which has been cooled down to the stabilizing temperature from the bloating temperature. The mechanical strength of glass varies directly with the viscosity. A cellular glass body chilled from the bloating temperature to a temperature lower than the annealing temperature of the glass, and then reheated to the stabilizing temperature has a more rigid and stronger shell than it would have if it had been brought to the same temperature by direct cooling from the bloating temperature. The method of the invention avoids the deformation of the cellular glass body during the period of cooling from the bloating to the stabilizing temperature which is practically inherent in the best processes known so far under all but ideal conditions of process control.

The method of the invention is applicable to all glasses which have heretofore been employed in the manufacture of cellular glass bodies. The requirements for such glasses include suitable viscosity characteristics, that is, a suitable change of viscosity with temperature. High viscosity glasses require higher bloating temperatures, and equipment capable of withstanding operation at such higher temperatures. Glasses that have a very steep viscosity-temperature characteristic, so-called "short glasses" make it difficult to control the bloating process, whereas "long glasses," those in which the rate of change of viscosity with temperature is relatively small, create difficulties in the control of the stabilizing period.

Obviously, a glass from which strong cellular glass bodies are to be manufactured should not crystallize during the bloating process nor later. In most instances, it will be important that the glass be inexpensive and its components be readily available. Many glass formulations are known which fulfill all the requirements for the conventional process, and the following glass compositions are merely illustrative of several types of material which may be processed by the method of the invention.

Since carbon in its various forms is the most convenient source of cellulating gas, the glass compositions given by way of example include sulfur trioxide, an oxidizing agent, which is added to the glass composition in the form of salt cake or otherwise.

| Glass composition | I | II | III | IV | V |
|---|---|---|---|---|---|
| $SiO_2$ | 71.6 | 72.3 | 72.0 | 70.7 | 62.0 |
| $Al_2O_3$ | 0.9 | 2.4 | 5.0 | 4.8 | 11.4 |
| $Fe_2O_3$ | 0.1 | 0.1 | 0.2 | 0.3 | 1.6 |
| CaO | 7.4 | 6.2 | 6.1 | 4.5 | 6.7 |
| MgO | 3.8 | 4.0 | 2.8 | 3.0 | 3.7 |
| $Na_2O$ | 15.8 | 14.6 | 13.5 | 12.4 | 13.1 |
| $B_2O_3$ | | | | 3.8 | |
| MnO | | | | | 1.1 |
| $SO_3$ | 0.4 | 0.4 | 0.4 | 0.3 | 0.3 |

Of these compositions, I to III combine low cost with desirable processing characteristics, IV is relatively expensive because of its boric anhydride content though otherwise very suitable, V is a special purpose glass which requires somewhat more careful process control than compositions I to IV.

The amount of carbonaceous material which is admixed to the finely powdered glass material containing sulfur trioxide in combined form depends on the physical properties and the reactivity of the carbon source. Generally, high purity and small grain size of the carbonaceous reagent will call for use of a relatively small amount. As little as 0.17% of a very fine carbon black added to a glass composition is satisfactory, but slightly more is recommended to leave a margin of safety. For best operating conditions, the following quantities of sources of carbon are preferred:

Percent
Carbon black _____ 0.20 to 0.25
Finely ground coke _____ 1.5 to 2.0
Natural graphite (flake) _____ 2–3

After intimate mixing of the carbonaceous material with the glass powder, a suitable quantity of the resulting frit is placed into heat resisting metal molds of sufficient volume to accommodate a cellulated body having a specific gravity of approximately 0.14. Panels having approximately dimensions of 20″ x 20″ x 6″ are readily produced by the method of the invention. The charged molds are heated to a temperature high enough to cause sintering of the glass mixture, but lower than the temperature at which the reaction between the carbonaceous material and the sulfur trioxide would be initiated. As soon as the contents of the mold reach the sintering temperature, further heat is applied to start bloating which then proceeds quite rapidly and practically isothermally.

As soon as the desired expansion is achieved, the mold with the cellular body produced is rapidly chilled to a temperature below the annealing temperature of the glass, whereby the shell of the glass body is solidified, and becomes quite rigid. This relatively low temperature is maintained for as short a period as possible in order to avoid chilling of the core and cracking of the shell. Quite surprisingly, it has been found that a freshly bloated body of cellular glass may be chilled through a very wide temperature range without any crack formation, and practically without shrinkage if the period at low temperature is of the order of ten minutes so that the internal gas pressure is largely maintained. Somewhat shorter periods are preferable for thinner sections, and 15 minutes are not too long for some heavier sections.

The glass body is then reheated to the stabilizing temperature and the changes still occurring take place within a rigid shell which prevents any further dimensional changes. The substantially finished product may be removed from the mold while still above the annealing temperature and further annealed and cooled in the usual manner. No shrinkage whatsoever occurs in the cooling furnace. No surface cracks form which would require trimming away of the surface portions of the finished cellular glass body.

The specific process data applicable to the glass compositions listed above for excellent results are tabulated below.

| | | | |
|---|---|---|---|
| 1. Glass composition | I, II or III | IV | V. |
| 2. Carbonaceous material. | Carbon black | Carbon black | Coke. |
| 3. Percentage amount of 2. | 0.20 | 0.20 | 2.0. |
| 4. Sintering temperature, °F. | 1,350 | 1,350–1,525 | 1,450–1,620. |
| 5. Sintering time, min. | 30 | 30 | 35. |
| 6. Bloating temperature, °F. | 1,525 | 1,525 | 1,620. |
| 7. Bloating time, min. | 20 | 20 | 25. |
| 8. Chilling temperature, °F. | 750 | 750 | 930. |
| 9. Chilling time, min. | 10 | 10 | 10. |
| 10. Stabilizing temperature, °F. | 1,165 | 1,165 | 1,290. |
| 11. Stabilizing time, min. | 25 | 25 | 30. |
| 12. Annealing temperature, °F. | 950 | 950 | 1,100. |

It will be understood that the above data are given for the purpose of illustrating preferred embodiments of the invention, and that they may have to be modified to suit specific requirements. The time periods indicated have been found most suitable for producing panels of the dimensions cited above, and the thickness of the actual body produced will have a bearing on these and other process variables. While the data for glass composition V are representative of high temperature values for glasses now of commercial interest in this field, glasses having sintering temperatures as low as 930° F. may be bloated at 1,470°. They are preferably stabilized at a lower temperature, for example, 1150°.

It is preferred to perform the method of the invention in a continuous furnace in which the sintering, bloating, chilling and normalizing steps are performed automatically. An example of a furnace that has been found successfully to perform the method of the invention under conditions of actual production is illustrated in the attached drawing in which:

FIG. 1 is a side elevational sectional view of the furnace, the section being taken in the longitudinal vertical median plane of the furnace;

FIG. 2 shows a section of the furnace of FIG. 1 taken on the line II—II, and looking in the direction of the arrows; and FIG. 3 is a corresponding view taken on the line III—III of FIG. 1.

Referring now to the drawing in detail, and initially to FIG. 1, the furnace is seen to consist of three consecutively arranged sections, namely a sintering and bloating section 1, a chilling section 2, and a stabilizing section 3. As best seen from FIG. 2, the sections 1 and 3 of the furnace are built up in the usual manner from fire bricks 4 covered by heat insulating porous blocks 5. The chilling section 2 which is shown in transverse section in FIG. 3 consists only of a sheet metal casing 6 which is equipped with a plurality of vent flaps 7 for convenient control of the temperature within the casing. Gates 8 of fire clay are vertically movable into and out of the furnace space at the two longitudinal ends of the chilling zone. They are adjusted so as to permit passage of molds 9 through the furnace with minimum clearance so as to reduce heat transfer between the high-temperature sections 1 and 3, and the low temperature section 2 of the furnace.

The entrance opening of the furnace at the sintering and bloating section is equipped with a similar gate 10 of fire clay, and a corresponding gate 11 is provided at the discharge opening of the furnace in the stabilizing section 3. The gates 10 and 11 are set at the same levels as the gates 8, and are equipped with hinged metal flaps 12 which provide an additional flexible closure capable of being displaced by the passing molds 9.

The molds 9 are conveyed through the furnace on a roller track 13 the rollers of which are driven in a well known manner. The sections 1 and 3 of the furnace are heated by means of gas heaters 14 which are located below the roller track 13. The portion of the bloating zone in which the highest process temperature is to be maintained is equipped with additional gas burners 15 above the level of the molds 9. Heat is thus mainly supplied from below the molds 9 so that the covers of the molds 9 are maintained at all times at a temperature approximately 20 to 50° F. lower than that of the bottoms of the molds. The chilling section 2 is not heated for obvious reasons.

Flues 16 in the furnace walls permit upward escape of the products of combustion of the gaseous fuel through control flaps 17 to a common chimney 18. It will be understood that the choice of heat source is determined by considerations not directly related to this invention, and that gas may be replaced by oil or electricity as a source of thermal energy.

Short roller tracks 19 at the entrance and discharge of the furnace are operated at slightly higher speed than the track 13 for best utilization of furnace capacity when molds are manually charged to the conveyor 19, and to facilitate transfer of the molds to the next operation. The rollers 20 which are in line with the entrance gate 12 are idlers, and the roller 21 which is in line with the discharge gate 11 is rotated at the same speed as the short discharge track 19 to prevent molds from halting in the gate opening and to prevent undue escape of heat from the furnace which would result therefrom.

The furnace is operated to satisfy the process conditions of the method of the invention. With the molds traveling in the direction of the arrow in FIG. 1, the charge is sintered in the first portion of the section 1. By suitable controls of the burners 14, the entrance portion of section 1 can be held at a uniform sintering temperature. The discharge portion of section 1 is held at the bloating temperature, and the temperature rise from the sintering to the bloating temperature is concentrated in a relatively short length of the furnace. This mode of operation has been contemplated in the process example for glass compositions I, II, or III above.

It is also possible to manipulate the burners for a gradual rise of temperature throughout the sintering zone from the sintering to the bloating temperature, as indicated in the exemplified process data for glass compositions IV and V. In all cases the temperature in the bloating zone proper is fairly closely controlled.

The transition from the bloating to the chilling temperature is quite sudden so that the mold and the outer shell layer of the cellular glass body is rapidly cooled to the chilling temperature, and the shell layer is solidified, while the interior core layer of the glass body remains substantially at the bloating temperature because of the insulating quality of the material. Still, it is necessary that chilling be relatively brief, and that the mold be promptly transferred to the stabilizing section 3.

After treatment at the stabilizing temperature, the blocks show no further tendency to shrink, and any stresses caused by the preceding chilling are adequately dissipated.

The molds discharged from the furnace are opened or disassembled, and the cellular glass bodies are removed and further annealed and cooled in the usual manner.

By individually varying the roller track speed in the several sections of the furnace, the dwell time of the molds at the various temperature levels may be controlled within relatively wide ranges. Since conveyorized furnaces having different traveling speeds in different portions of the conveyor path are well known in themselves, a more detailed description of this feature of the furnace for performing the method of the invention is not necessary.

The exact conditions of temperature and time in the method of the invention are subject to considerable variation to suit specific materials and available equipment. Generally, the glass composition and the bloating reagents are preferably selected in such a manner that there be a safe margin between the sintering temperature of the glass and the temperature at which the bloating reaction proceeds at a vigorous rate. This temperature margin should be of the order of 90° F. if the glass is sintered at a substantially constant temperature. If such a margin is not available, and cannot be made available, it is desirable to sinter at a gradually rising temperature as indicated above. The chilling temperature is preferably 150 to 200° F. below the annealing temperature, and the stabilizing temperature 150 to 200° F. above the annealing temperature.

In choosing the dwell times of the molds in the several furnace sections, factors influencing heat transfer must be taken into consideration. The examples given for the purpose of illustrating the process of the invention are based on conditions prevailing in semi-muffle furnaces with moderate movement of gases in the furnace atmosphere. The use of molds having a steel thickness of ¼ inch was assumed. Those skilled in the art will have no difficulty in adjusting the process variables to other specific conditions.

Obviously many modifications and variations of the present invention are possible in the light of the above teachings. It is therefore to be understood, that within the scope of the appended claim, the invention may also be practiced otherwise than as specifically described.

This is a continuation-in-part of our co-pending application Serial Number 733,568, filed on May 7, 1958, now abandoned, for a "Method and Device for the Manufacture of Cellular Glass."

What is claimed and desired to be protected by Letters Patent of the United States is:

In a method of sintering cellular glass bodies, the steps of mixing powdered glass containing sulfur trioxide in combined form with a carbonaceous material, sulfur trioxide being capable of reacting with said carbonaceous material to form a gas at a reaction temperature of 1470° to 1620° F., and said glass having a sintering temperature in the range of 930 to 1450° F.; heating the mixture obtained to said sintering temperature in a mold until said glass is substantially sintered; heating the sintered mixture to said reaction temperature, whereby the sintered glass is softened and a cellulated glass body is obtained; chilling the cellulated glass body from said reaction temperature to a chilling temperature of 750 to 930° F., said chilling temperature being substantially 150 to 200° F. below the annealing temperature of said glass, and holding it at said chilling temperature for a period of the order of ten minutes and sufficient to harden an outer shell layer of said cellular glass body while maintaining a core layer of said glass body substantially at said reaction temperature; and thereafter heating said glass body from said chilling temperature to a stabilizing temperature of 1150 to 1290° F., said stabilizing temperature being lower then said sintering temperature, but approximately 200° F. higher than the annealing temperature of said glass.

References Cited by the Examiner

UNITED STATES PATENTS

| | | | |
|---|---|---|---|
| 2,191,658 | 2/40 | Haux | 65—20 |
| 2,306,330 | 12/42 | Dewey | 65—22 X |
| 2,401,582 | 6/46 | Owen | 65—18 |
| 2,445,298 | 7/48 | Baker | 65—22 |
| 2,536,192 | 1/51 | Littleton | 65—22 |
| 2,544,954 | 3/51 | Ford | 65—22 |

OTHER REFERENCES

"Glass The Miracle Maker," by C. J. Phillips, published by Pitman Publishing Corp., 1941, New York, page 100.

DONALL H. SYLVESTER, *Primary Examiner.*

IVAN R. LADY, ARTHUR P. KENT, MORRIS O. WOLK, *Examiners.*